UNITED STATES PATENT OFFICE.

JOHANNES CLAZINUS MARIE van DIGGELEN, OF AMSTERDAM, NETHERLANDS.

PRODUCTION OF TEXTILE MATERIAL.

1,189,756. Specification of Letters Patent. Patented July 4, 1916.

No Drawing. Application filed November 16, 1915. Serial No. 61,845.

*To all whom it may concern:*

Be it known that I, JOHANNES CLAZINUS MARIE VAN DIGGELEN, a subject of the Queen of the Netherlands, and a resident of Amsterdam, Netherlands, have invented an Improvement in the Production of Textile Material, of which the following is a full description.

Many attempts have been made to produce from grass, straw and other vegetable matter, material capable of being spun and woven. It has, for instance, been proposed to boil the raw material with a caustic liquid during half an hour and then, after washing the material, to boil it for a like period in an ammoniacal solution of copper sulfate with the addition of soda, if necessary. The product so obtained is then washed and dried.

The object of the present invention is to combine the above mentioned processes.

According to the invention the raw material is boiled in a solution of caustic soda and copper sulfate to which has been added a certain proportion of ammonium chlorid.

The following is given by way of example to indicate a method of carrying into effect, the invention as applied to the treatment of straw: To each liter of a solution of caustic soda of 10 to 20 per cent. strength, a proportion of copper sulfate equivalent to 0.25% of the weight of the vegetable matter treated and 5 to 6 drops of a saturated solution of ammonium chlorid are added. The material to be treated is boiled in this liquid for about fifteen minutes or at most a half an hour, according to the condition of the material, the apparatus employed being provided with a device by which the mixture is stirred continually. The boiling process being completed the material is drained and then washed with boiling water till the blue color has disappeared and the material has no longer an alkaline reaction. The product is then dried.

The improved process enables material capable of being woven and spun to be obtained after a treatment of short duration. The process is moreover cheap and is easily applicable and yields fibers in a particularly pure form. The fibers in addition are not subjected to such severe treatment as in certain known processes and they are therefore very strong and more solid because the silicic acid is not completely dissolved out by the treatment according to the invention.

Having now particularly described and ascertained the nature of my said invention and in what manner the same is to be performed, I declare that what I claim is:—

The process of preparing from grass, straw and other vegetable matter, material capable of being spun and woven, in which the vegetable matter is boiled in a solution of caustic soda and copper sulfate to which ammonium chlorid has been added, and is subsequently washed, preferably in boiling water.

In witness whereof I have hereunto set my hand in the presence of two witnesses.

JOHANNES CLAZINUS MARIE van DIGGELEN.

Witnesses:
D. KLEYN,
K. v. D. BOOGAARD.